(12) United States Patent
Rae et al.

(10) Patent No.: US 8,600,062 B2
(45) Date of Patent: Dec. 3, 2013

(54) OFF-LINE CONTENT DELIVERY SYSTEM WITH LAYERED ENCRYPTION

(75) Inventors: Christopher Rae, San Diego, CA (US); Robert Kulakowski, Rancho Santa Fe, CA (US); Subrata Datta, San Diego, CA (US); Eiji Oga, San Diego, CA (US); Nicolas Pauli, San Diego, CA (US); Akinwale Olugbemiga Olugbile, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 472 days.

(21) Appl. No.: 12/840,160

(22) Filed: Jul. 20, 2010

(65) Prior Publication Data

US 2011/0069836 A1    Mar. 24, 2011

Related U.S. Application Data

(60) Provisional application No. 61/226,973, filed on Jul. 20, 2009.

(51) Int. Cl.
*H04L 9/08* (2006.01)
*H04L 9/00* (2006.01)

(52) U.S. Cl.
USPC .......................................... 380/282; 380/259

(58) Field of Classification Search
USPC .................................. 380/282, 259
See application file for complete search history.

(56) References Cited

U.S. PATENT DOCUMENTS

| | | | |
|---|---|---|---|
| 7,382,883 B2 | 6/2008 | Cross et al. | |
| 7,461,406 B2 | 12/2008 | Pelly et al. | |
| 2004/0017918 A1* | 1/2004 | Nicolas | 380/279 |
| 2007/0088947 A1* | 4/2007 | Cross et al. | 713/165 |
| 2007/0226807 A1* | 9/2007 | Ginter et al. | 726/27 |
| 2008/0089516 A1* | 4/2008 | Cocchi et al. | 380/200 |

FOREIGN PATENT DOCUMENTS

WO    2011/011444 A1    1/2011

OTHER PUBLICATIONS

International Search Report for Application PCT/US2010/042645, Report completed Oct. 18, 2010, mailed Oct. 28, 2010, 3 pgs.
Written Opinion for Application PCT/US2010/042645, completed Oct. 18, 2010, mailed Oct. 28, 2010, 7 pgs.

* cited by examiner

*Primary Examiner* — Teshome Hailu
(74) *Attorney, Agent, or Firm* — KPPB LLP

(57) ABSTRACT

Systems and methods are described for over-encrypting symmetrically pre-encrypted content for off-line delivery to playback devices using portable media drives in accordance with embodiments of the invention. One embodiment of the method of the invention includes symmetrically pre-encrypting the content, receiving a request to issue content for playback on at least one playback device associated with a user account, where each playback device includes a processor containing a private key assigned to the playback device by a conditional access system, generating a content key and over-encrypting at least a portion of the symmetrically pre-encrypted content in response to the request, obtaining a public key for each playback device, encrypting a copy of the content key using the public key of each playback device associated with the user account, and delivering the over-encrypted content and the at least one encrypted copy of the content key to a playback device associated with the user account.

29 Claims, 8 Drawing Sheets

OFF-LINE CONTENT DELIVERY SYSTEM WITH LAYERED ENCRYPTION

CROSS REFERENCE TO RELATED CASES

This application claims priority to U.S. Provisional Patent Application No. 61/226,973, filed Jul. 20, 2009, the entirety of which is incorporated herein by reference.

FIELD OF THE INVENTION

The present invention generally relates to off-line content delivery and more specifically to the off-line delivery of symmetrically encrypted content to specific playback devices using asymmetric cryptography.

BACKGROUND OF THE INVENTION

A variety of systems exist for the digital distribution of content (i.e. multimedia such as movies, televisions shows, and other combinations of audio and/or video information). The term online content distribution system typically refers to a system that enables the digital distribution of content via a network. The content can be downloaded as a multimedia file or streamed to a playback device. The term off-line content delivery system refers to a system that involves the delivery of digital content using some form of fixed media such as an optical storage device, or a portable media drive. In an off-line content delivery system, the delivery of the content relies upon the physical transportation of the fixed media. In many instances, off-line content delivery systems can overcome bandwidth limitations imposed by existing network infrastructure. Accordingly, companies such as Netflix, Inc. of Los Gatos, Calif. have achieved considerable success delivering DVDs to subscribers via the postal service.

A number of Video on Demand (VOD) systems exist for distribution of on-demand content via cable, IPTV, and/or satellite television systems. These systems typically use a Conditional. Access or CA system to encrypt the VOD content for playback on authorized playback devices. The CA systems often protect the content using processes including encryption processes and provide an encrypted Entitlement Control Message (ECM), which can be used by an authorized playback device to access the protected content. In many systems that utilize ECMs, the CA system also generates a separate Entitlement Management Message (EMM), which enables a playback device authorized to playback the content to decrypt the ECM and playback the on-demand content.

Many CA systems use symmetric encryption algorithms such as 128-bit AES or RC4 encryption to pre-encrypt on-demand content prior to storing the encrypted content on dedicated video-on-demand (VOD) servers, or downloading the encrypted content to client devices in "push VOD" applications. Symmetric-key encryption algorithms are a class of algorithms for cryptography that use trivially related, often identical, cryptographic keys for both decryption and encryption. The encryption key is trivially related to the decryption key, in the sense that they may be identical or there is a simple transformation to go between the two keys. The keys represent a shared secret between two or more parties that can be used to maintain the privacy of the encrypted content. Some content owners regard the use of symmetric encryption algorithms as representing a single point of compromise for hackers.

SUMMARY OF THE INVENTION

Systems and methods for over-encrypting symmetrically pre-encrypted content for off-line delivery to playback devices using portable media drives in accordance with embodiments of the invention are disclosed. In many embodiments, the over-encryption process utilizes public key/private key encryption algorithms, and the over-encrypted content is less susceptible to the types of attacks that can compromise systems that rely upon symmetric encryption only.

One embodiment of the method of the invention includes symmetrically pre-encrypting the content, receiving a request to issue content for playback on at least one playback device associated with a user account, where each playback device includes a processor containing a private key assigned to the playback device by a conditional access system, generating a content key and over-encrypting at least a portion of the symmetrically pre-encrypted content in response to the request, obtaining a public key for each playback device, encrypting a copy of the content key using the public key of each playback device associated with the user account, and delivering the over-encrypted content and the at least one encrypted copy of the content key to a playback device associated with the user account.

In a further embodiment of the method of the invention, the symmetrically pre-encrypted content includes an entitlement control message and over-encrypting at least a portion of the symmetrically pre-encrypted content in response to the request comprises over-encrypting at least a portion of the entitlement control message.

In another embodiment of the method of the invention, the conditional access system issues device certificates including a public key for each device and further comprising delivering the device certificate of each playback device associated with the user account to the playback device with the over-encrypted content and the at least one encrypted copy of the content key.

In a still further embodiment of the method of the invention, delivering the over-encrypted content and the at least one encrypted copy of the content key to a playback device associated with the user account comprises writing the over-encrypted content and the at least one encrypted copy of the content key to a portable media drive.

In still another embodiment of the method of the invention the symmetrically pre-encrypted content includes an entitlement control message and over-encrypting at least a portion of the symmetrically pre-encrypted content in response to the request comprises over-encrypting at least a portion of the entitlement control message.

In a yet further embodiment of the method of the invention, the conditional access system issues device certificates including a public key for each device and further comprising writing the device certificate of each playback device associated with the user account to the portable media drive.

In yet another embodiment of the method of the invention, obtaining a public key for each playback device further comprises obtaining a public key for each playback device from the conditional access system.

In a further embodiment again of the method of the invention, obtaining a public key for each playback device further comprises obtaining a public key for each playback device from the portable media drive.

A further embodiment of the invention includes a kiosk configured to receive a portable media drive and to communicate with a headend including a conditional access system via a network and a storage device containing symmetrically pre-encrypted content, and a playback device configured to communicate with a portable media drive and to communicate with the headend via a network, where the playback device includes a processor containing a private key issued to the playback device by the conditional access system. In addition, the kiosk is configured to issue protected content to the portable media drive by retrieving symmetrically pre-encrypted content corresponding to user selections from the storage device, and to over-encrypt at least a portion of the retrieved symmetrically pre-encrypted content using at least one content key generated by the kiosk, the conditional access system assigns a unique public key to each playback device, the kiosk is configured to encrypt a copy of each content key using the public key of at least one playback device associated with a user account, the kiosk is configured to write the encrypted copy of each content key to the portable media drive, the playback device is configured to obtain each content key in the clear using its private key and to remove the over-encryption from the protected content using the content key, and the playback device is configured to inspect the symmetrically encrypted content and obtain information from the conditional access system enabling playback of the symmetrically encrypted content.

In another embodiment of the invention, the storage device is local to the kiosk.

In a still further embodiment of the invention, the storage device is located at the headend.

In still another embodiment of the invention, the symmetrically pre-encrypted content includes an entitlement control message and the kiosk is configured to over-encrypt at least a portion of the entitlement control message using the content key.

In a yet further embodiment of the invention, the content key is randomly generated by the kiosk.

In yet another embodiment of the invention, the process used to randomly generate the content key is seeded by the public key of at least one of the playback devices associated with the user.

In a further embodiment again of the invention, the user account is maintained on a subscriber management system at the headend.

In another embodiment again of the invention, the kiosk is configured to obtain the public key for each playback device associated with the user account from the conditional access system.

In a further additional embodiment, the kiosk is configured to obtain the public key for each playback device associated with the user account from the portable media drive.

In another additional embodiment, the conditional access system issues device certificates including a public key for each device.

In a still yet further embodiment, the kiosk is configured to write the device certificates for each playback device associated with the user account to the portable media drive.

In still yet another embodiment, the playback device is a portable playback device incorporating a portable media drive.

A still further embodiment again includes a processing system configured to communicate with a portable media drives via a communication port. In addition, the processing system is configured to retrieve symmetrically pre-encrypted content stored on a storage device in response to a user request received via a user interface, the processing system is configured to over-encrypt at least a portion of each piece of retrieved content using a content key, the kiosk is configured to obtain a public key assigned to at least one playback device associated with a user account, the kiosk is configured to encrypt a copy of each content key using the public key assigned to each playback device associated with the user account, and the kiosk is configured to write the over-encrypted content and the encrypted copies of each content key to a portable media drive via the communication port.

In still another embodiment again, the storage device containing the symmetrically pre-encrypted content is a local storage device.

In a still further additional embodiment, the kiosk configured to communicate with the storage device containing the symmetrically pre-encrypted content via a network connection.

In still another additional embodiment, the symmetrically pre-encrypted content includes an entitlement control message and the kiosk is configured to over-encrypt at least a portion of the entitlement control message using the content key.

In a yet further embodiment again, each content key is randomly generated by the kiosk.

In yet another embodiment again, the kiosk is configured to obtain the public key for each playback device associated with the user account from a conditional access system via a network connection.

In a yet further additional embodiment again, the kiosk is configured to obtain the public key for each playback device associated with the user account from a portable media drive via the communication port.

In yet another additional embodiment again, device certificates contain the public keys for each playback device.

In a further additional embodiment again, the kiosk is configured to write the device certificates for each playback device associated with the user account to a portable media drive via the communication port.

Another additional embodiment again includes a playback client system including a private key, where the playback client system is configured to communicate with a portable media drive and with a conditional access system via a network connection. In addition, the playback client system is configured to receive over-encrypted content and an encrypted content key from a portable media drive, the playback client system is configured to obtain the content key in the clear using the private key, the playback client system is configured to remove the over-encryption from the content using the content key, and the playback client system is configured to use information from the content to obtain information enabling playback of the content from the conditional access system via the network connection.

In another further embodiment, the portable media drive is an integrated part of the playback device.

In still another further embodiment, the portable media drive is configured to communicate with the portable media drive via a communication port.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

Message in accordance with an embodiment of the invention.

Figure 5A:
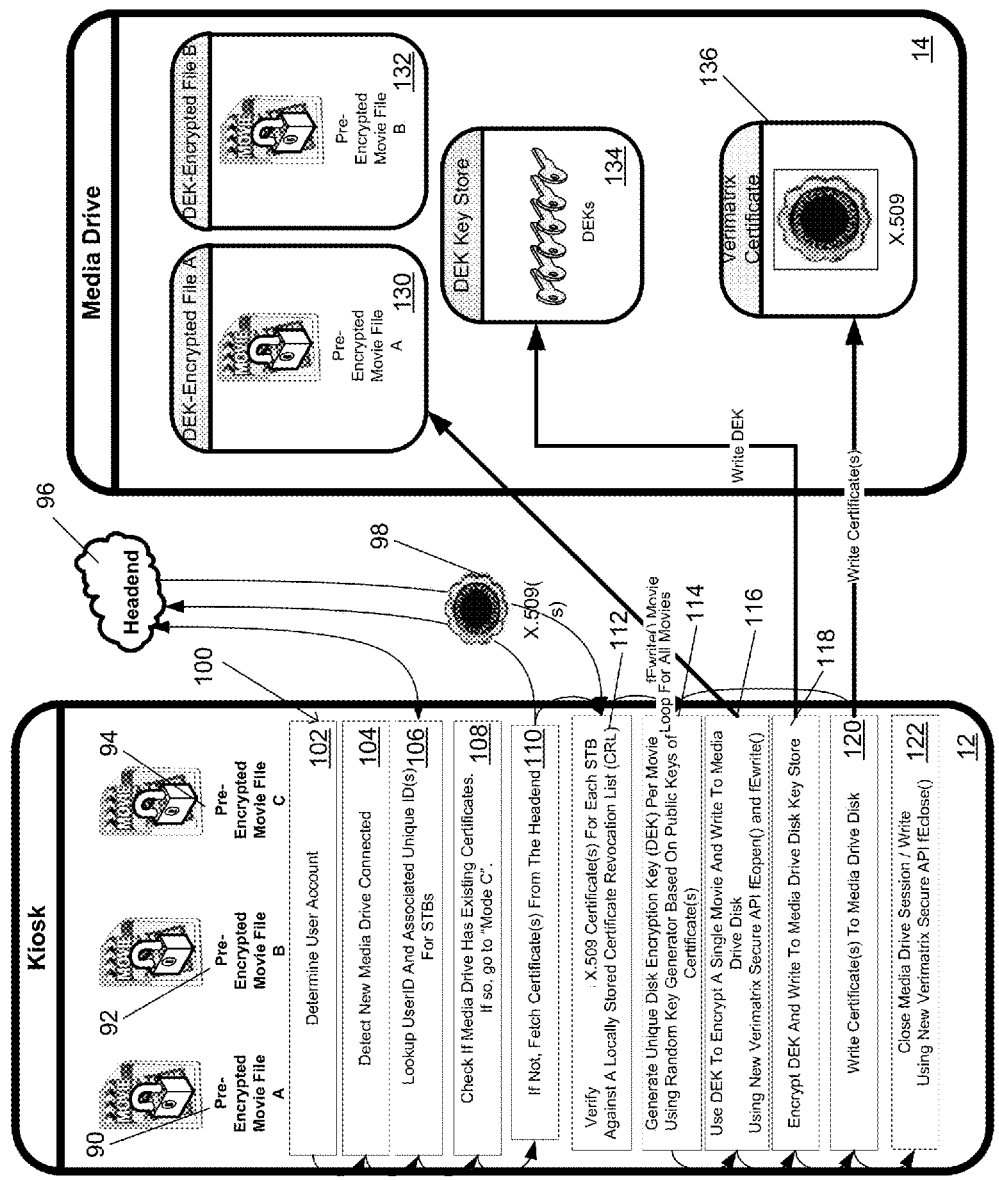
Figure 5B:
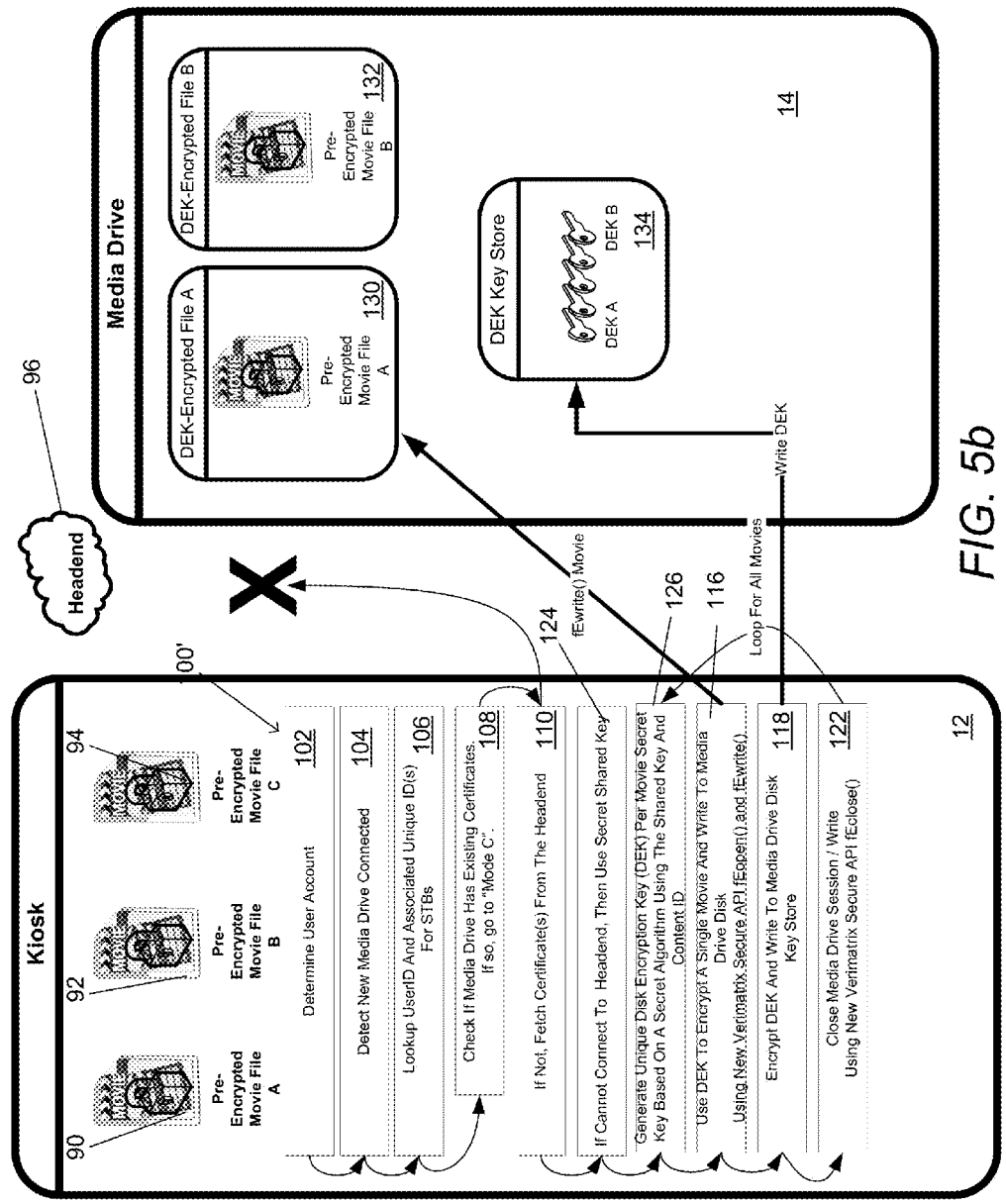
Figure 5C:
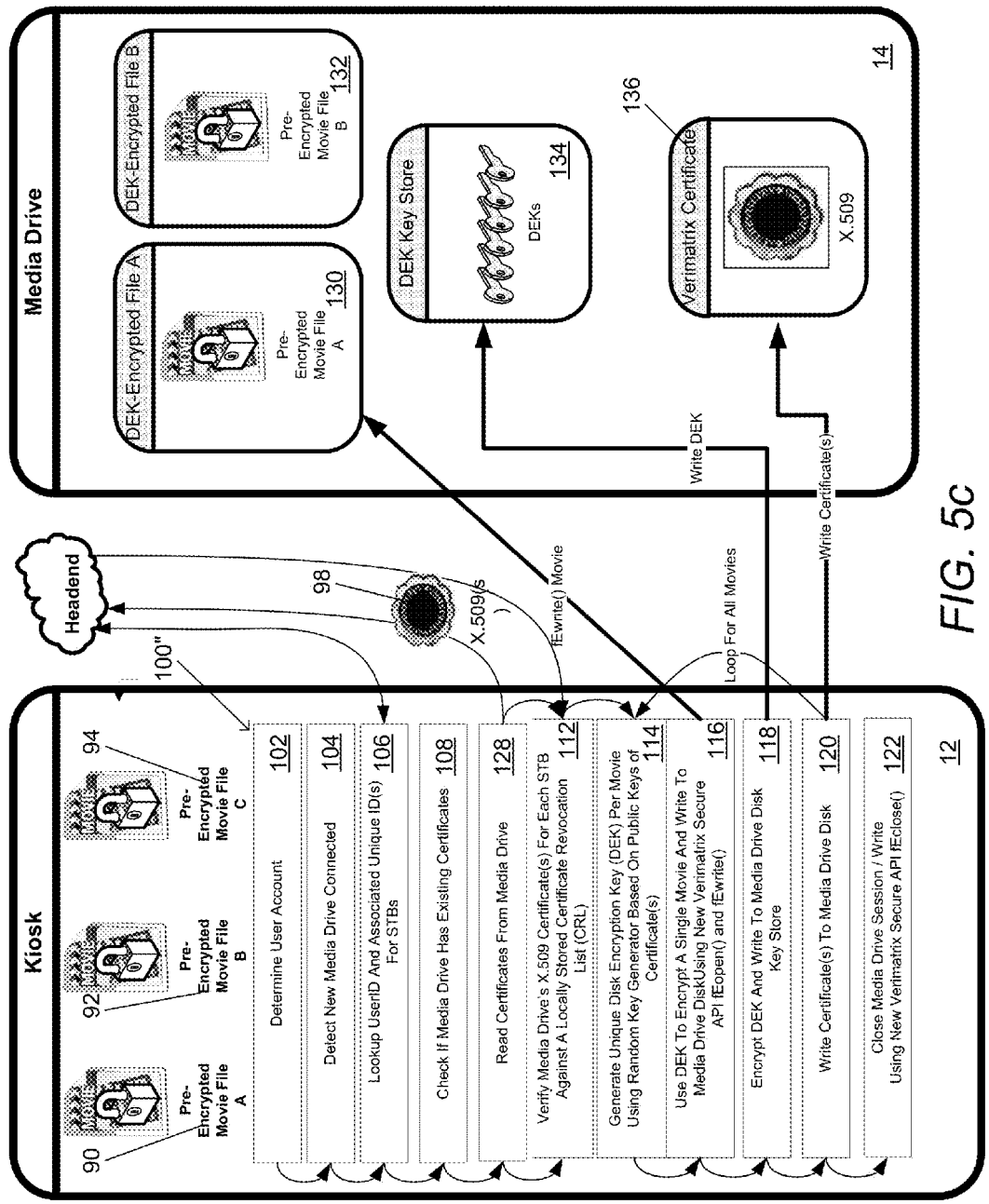

FIGS. 5a-5c illustrate processes for issuing protected content to a portable media drive based upon the availability of public keys utilized during the over-encrypting processes in accordance with an embodiment of the invention.

Figure 6:
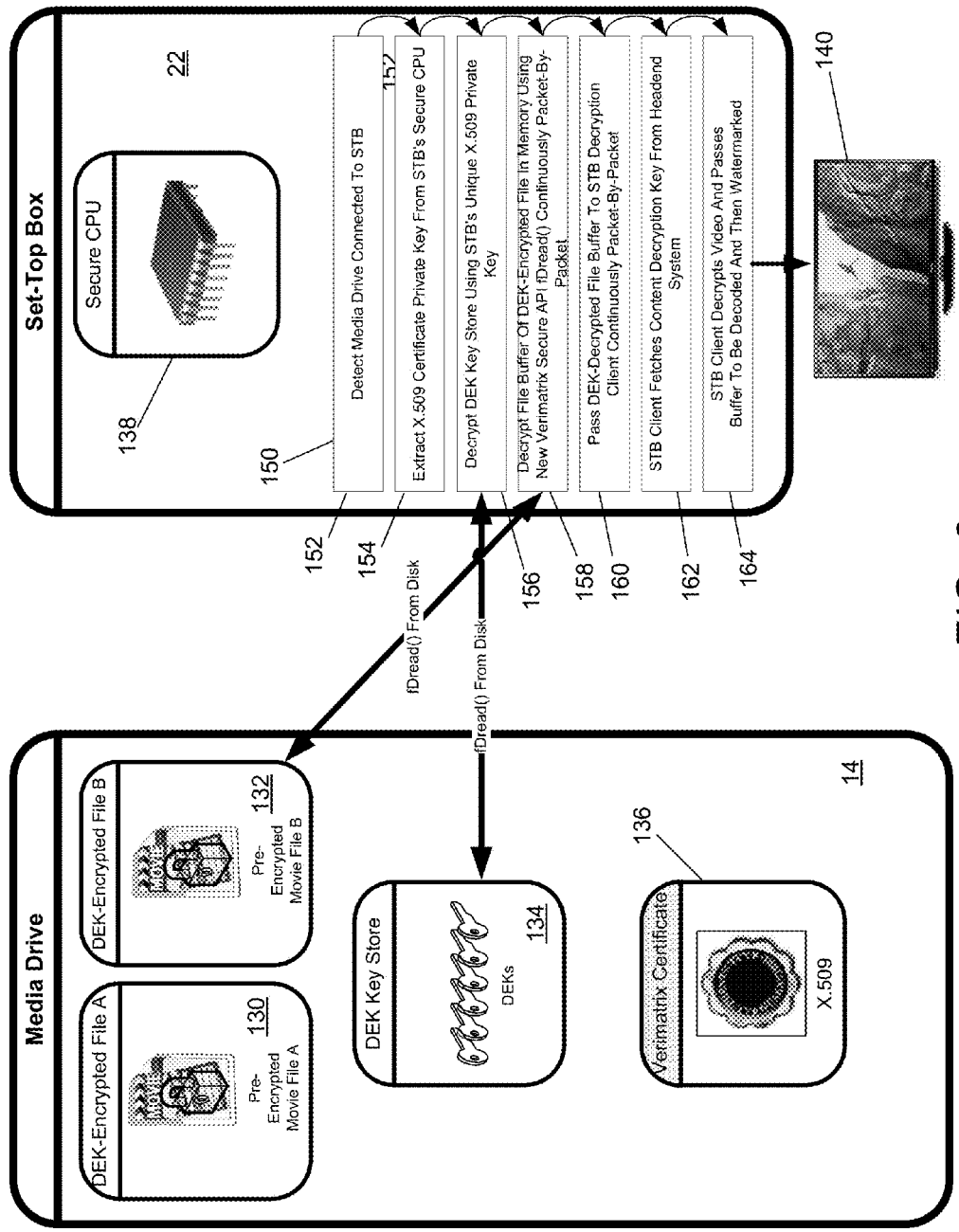

FIG. 6 illustrates a process for decrypting over-encrypted content provided on a portable media drive for playback in accordance with an embodiment of the invention.

DETAILED DESCRIPTION

Turning now to the drawings, systems and methods for over-encrypting symmetrically pre-encrypted content for off-line delivery to playback devices using portable media drives in accordance with embodiments of the invention are illustrated. In many embodiments, a portable media drive or storage device is used to obtain content from a kiosk for playback via one or more playback devices. In several embodiments, the portable media drive and the playback devices are associated with a specific user account. When the portable media drive is connected to a kiosk at a retail location, the kiosk authenticates the user and enables the user to select one or more pieces of content to transfer to the portable media drive. The kiosk retrieves the selected content, which is symmetrically pre-encrypted, and over-encrypts the whole or a portion of the symmetrically pre-encrypted content using a key generated by the kiosk that is unique to the specific purchase/customer transaction and which can be referred to as "content key". In many embodiments, each playback device that participates in the system has a locally stored private key and an associated public key. Therefore, encrypted copies of the content key can be made by separately encrypting the content key using the public key of each playback device associated with the user's account. In this way, each playback device associated with a user's account can use its private key to access the content key. When over-encrypted content and encrypted copies of the content keys are stored on a portable media drive, any of the playback device's associated with the user's account can connect to the portable media drive and use the playback device's private key to decrypt the content keys and remove the over-encryption in order to obtain playback permission from a conditional access system. In addition, the portable media drive may itself be a network connected playback device such as a mobile phone or a portable media player. The private keys of playback devices that are not associated with the user's account cannot be used to gain access to the content key. Due to the unique keys for each playback device, there is control over which devices a given user can use to playback the content. Therefore, the over-encryption effectively restricts playback of the content on the portable media drive to only those playback devices associated with the user's account. Furthermore, the use of public key/private key encryption algorithms to protect the content key reduces the vulnerability of the system to the types of attacks that can comprise symmetric-key encryption algorithms. Systems for over-encrypting symmetrically pre-encrypted content for off-line content delivery in accordance with embodiments of the invention are discussed further below.

Off-Line Content Delivery Systems

Figure 1:
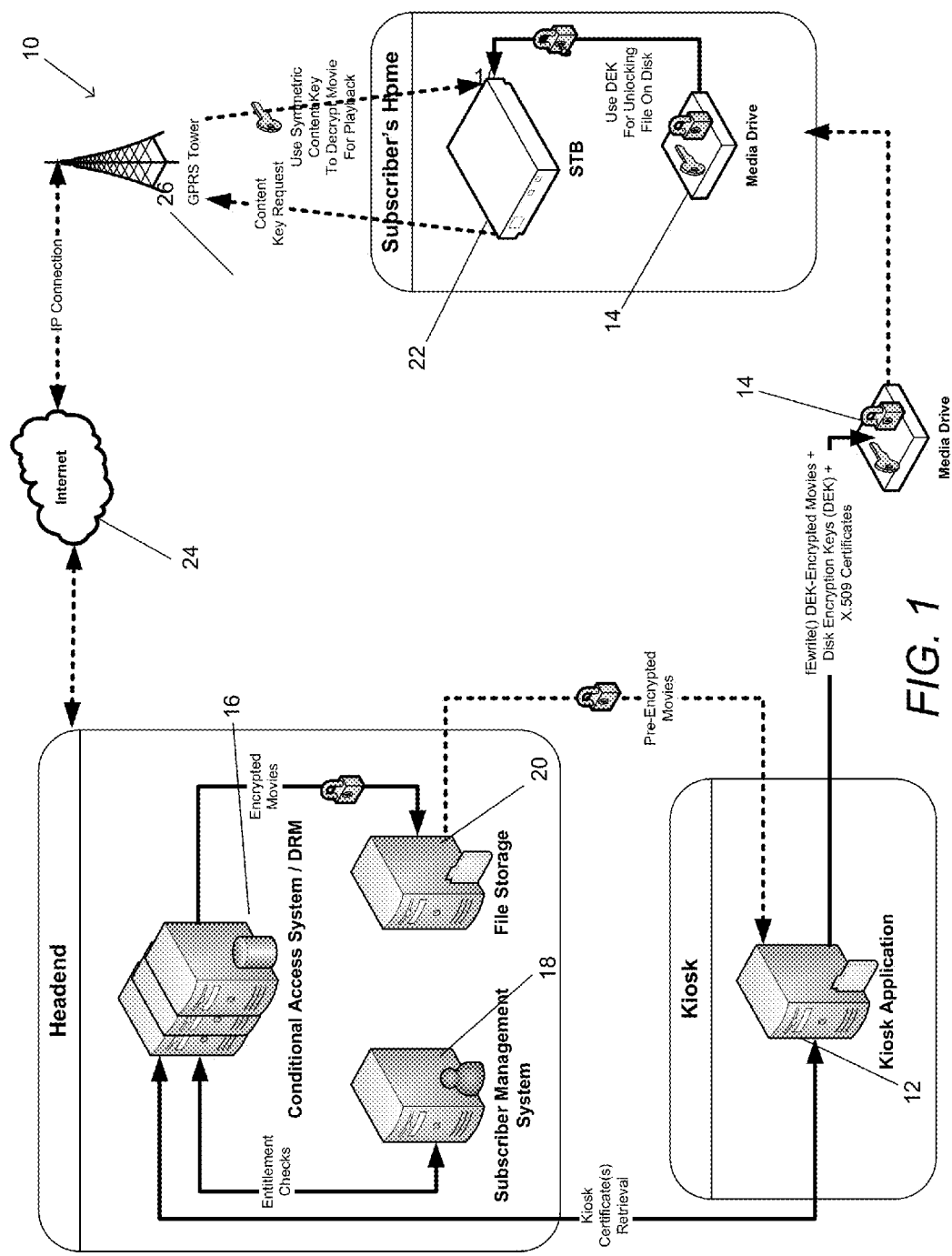
FIG. 1 illustrates an off-line content delivery system that utilizes portable media drives to transport protected content from kiosks to playback devices in accordance with embodiments of the invention.

An off-line content delivery system in accordance with an embodiment of the invention is illustrated in FIG. 1. The system 10 includes a kiosk 12 that can be used to issue protected content to a portable media drive 14. The kiosk can be implemented using a processing system such as, but not limited to, a personal computer such as an iMac manufactured by Apple Computer Inc. of Cuppertino, Calif., running OSX and configured using appropriate software to perform the kiosk functions described herein. The kiosk communicates with a headend that includes a CA system 16 or a Digital Rights Management (DRM) system (the term CA system is used herein to refer to either type of system), a subscriber management system 18, and file storage 20 containing symmetrically pre-encrypted content that can be retrieved by the kiosk. The portable media drive 14 is configured to interface with one or more playback devices 22, which are configured to communicate with the CA system 16 at the headend to obtain information (typically cryptographic information) used to playback the protected content stored on the portable media drive. In the illustrated embodiment, the playback devices 22 are set top boxes that are configured to communicate with the CA system 16 by accessing the Internet 24 via a cellular network 26. In many embodiments, a variety of playback devices can participate in the off-line content delivery system 10 including personal computers, mobile phones, and other Internet connected consumer electronics devices such as Internet connected DVD players, Blu-Ray players, and televisions. In addition, a playback device and a storage device can be integrated. For example, playback devices can include network connected portable playback devices including but not limited to the IPod Touch or iPhone manufactured by Apple Computer, Inc. of Cupertino Calif. Indeed a playback device can be any device incorporating or capable of interfacing with a portable media drive and connecting with a CA system via a network that includes a playback client (i.e. hardware including decode circuitry and/or a general purpose microprocessor, and in many instances firmware and/or software, enabling playback of content). As can readily be appreciated, any technique for establishing a connection between the playback device and the CA system 16 can be utilized by the playback device to obtain information from the CA system required for playback of protected content contained on a portable media drive 14. Ways in which the kiosk can issue protected content and playback devices can access protected content are discussed further below.

Issuing Content

Figure 2:
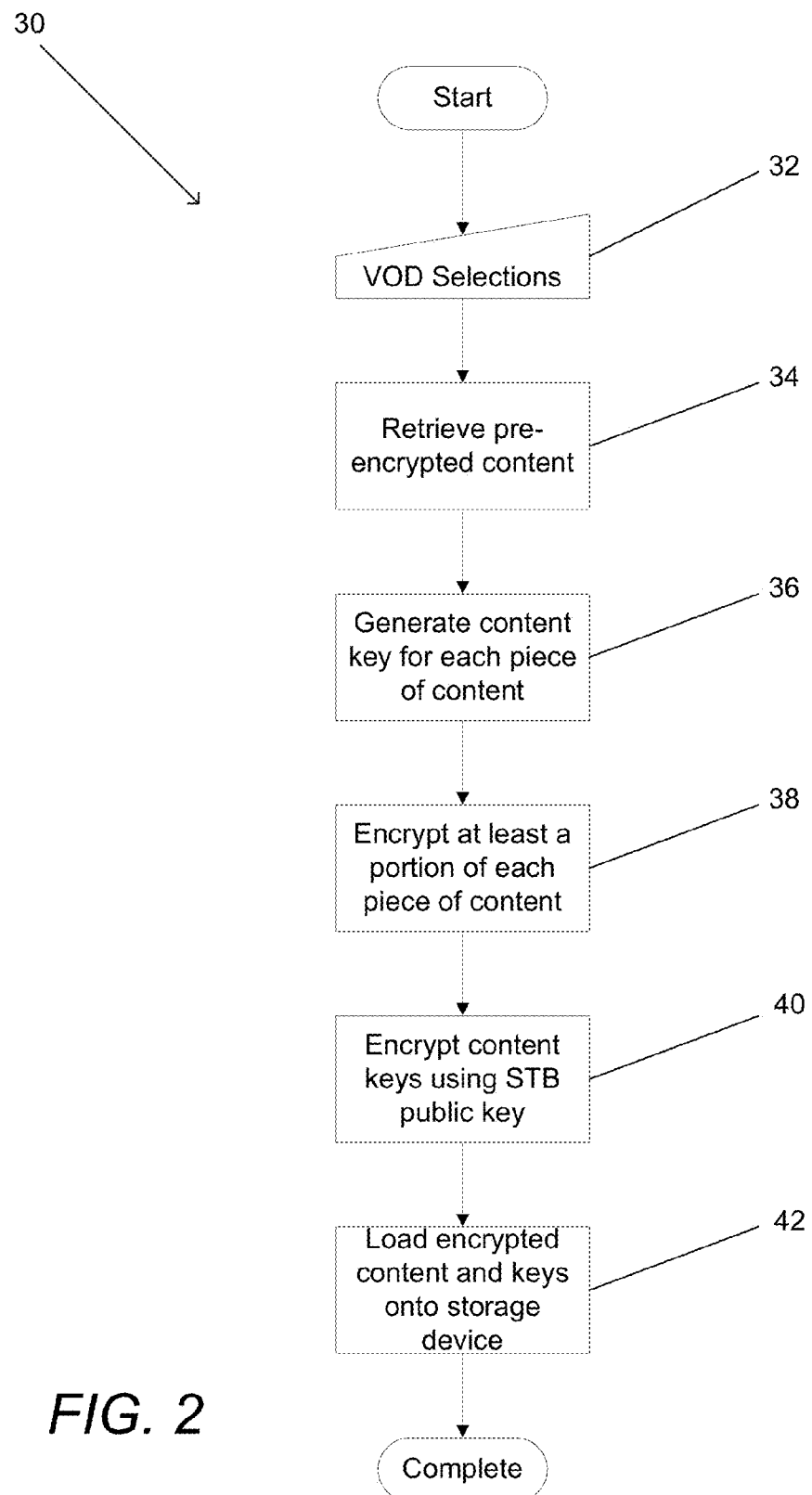
FIG. 2 is a flow chart illustrating a process for over-encrypting symmetrically pre-encrypted content using a public key associated with a playback device in accordance with an embodiment of the invention so that the over-encrypted content is only capable of playback using the playback device's private key.

A process utilized by a kiosk when issuing protected content to a portable media drive in accordance with an embodiment of the invention is illustrated in FIG. 2. The process 30 includes authenticating the user via a user interface and receiving (32) VOD selections from the user. The authentication of the user typically involves the kiosk accessing the user's subscriber information via a subscriber management system at the headend. As is discussed further below, each user has an account containing the unique identities of playback devices associated with the user.

As part of the process, the kiosk retrieves (34) the symmetrically pre-encrypted content corresponding to the user's VOD selections. Kiosks in accordance with many embodiments of the invention can perform an individual or batch download, in advance or in real-time, of the symmetrically pre-encrypted content from file servers at the headend and locally store the symmetrically pre-encrypted content for retrieval in response to user requests. Depending upon available network bandwidths, kiosks can also be provided that are capable of retrieving symmetrically pre-encrypted content from file servers at the head end in response to a specific user request. In many embodiments, the kiosk receives the pre-encrypted content via other methods including but not limited to via a media drive, a DVD, and/or a firmware update. As can readily be appreciated, the manner in which the kiosk receives pre-encrypted content and the way in which the kiosk retrieves the pre-encrypted content from local and/or remote storage in accordance with embodiments of the invention is dependent upon the specific application.

In order to over-encrypt the symmetrically pre-encrypted content, a content key is generated (36). The same content key is typically randomly generated and can be used for multiple pieces of content or a separate content key can be generated for each selected piece of content. In systems that use signed certificates associated with specific playback devices (see discussion below), one or more public keys of the playback devices associated with the user can be used to seed the generation of the content key. However, the content key can be generated using any of a variety of techniques appropriate to the application.

At least a portion of each piece of symmetrically pre-encrypted content is over-encrypted (38) using the appropriate content key. A symmetric encryption algorithm is used to perform the over-encryption such as but not limited to AES, DES, or RC4. As is discussed further below, many embodiments of the invention include a CA system that generates an Entitlement Control Message (ECM) associated with each piece of symmetrically pre-encrypted content and the content key is used to over-encrypt a portion of the ECM which contains the pre-encryption key (sometimes called a Control Word). In other embodiments, the portions of the symmetrically pre-encrypted content that are over-encrypted using the content key are determined by the requirements of the specific application.

As noted above, the kiosk is able to obtain information concerning the playback devices associated with a user account from the subscriber management system. The kiosk can use the identities of the playback devices associated with the user's account to retrieve a public key for each playback device. In order to restrict playback of the over-encrypted content to only those playback devices associated with the user's account, a copy of each content key is separately encrypted (40) using the public key of each playback device. Public key encryption algorithms that can be used to encrypt the content keys include algorithms such as but not limited to RSA or ECC. As is discussed further below, kiosks in accordance with many embodiments of the invention operate in a disconnected mode when a network connection to the headend is unavailable. In this mode, the kiosk can attempt to obtain the signed certificates for the playback devices from the portable media drive (see discussion below) or use a shared encryption key as a measure of last resort. Disconnected modes of operation in accordance with embodiments of the invention are discussed further below.

In a number of embodiments, the CA system issues signed certificates to the kiosk that attest to the validity of the public keys for specific playback devices. In several embodiments, the CA system issues certificates and private keys at the time of manufacture of playback devices. In many embodiments, a key pair and a device certificate are generated in real time when the playback device is first connected to the CA system. Examples of appropriate device certificates include but are not limited to certificates in accordance with the X.509 standard specified by the ITU-T. Alternatively, playback devices may be pre-provisioned with a key pair and a certificate in a factory.

The content is issued by writing (42) the over-encrypted content with a store file containing the encrypted content keys to the portable media drive. In many embodiments, the device certificates for the playback devices associated with the user account are also written to the portable media drive. When a portable media drive that includes device certificates is provided to a kiosk, the kiosk can use the certificates to issue additional protected content to the portable media drive.

In the process illustrated in FIG. 2, the use of a symmetric-key algorithm to over-encrypt the content combined with the use of a public key encryption algorithm to encrypt the content key enables the issuance of content for playback within a domain (i.e. the playback devices associated or registered to a specific user account) using public key encryption technologies that are more robust than symmetric-key algorithms. In this way, systems in accordance with embodiments of the invention can be more robust than conventional. CA systems that utilize symmetric-key encryption algorithms only.

Although a specific process for issuing content is illustrated in FIG. 2, any of a variety of processes involving the over-encryption of symmetrically pre-encrypted content using public keys associated with playback devices can be utilized in accordance with embodiments of the invention. Process for the over-encryption of symmetrically pre-encrypting content in accordance with embodiments of the invention are discussed further below.

Over-Encrypting Symmetrically Pre-Encrypted Content

Figure 3:
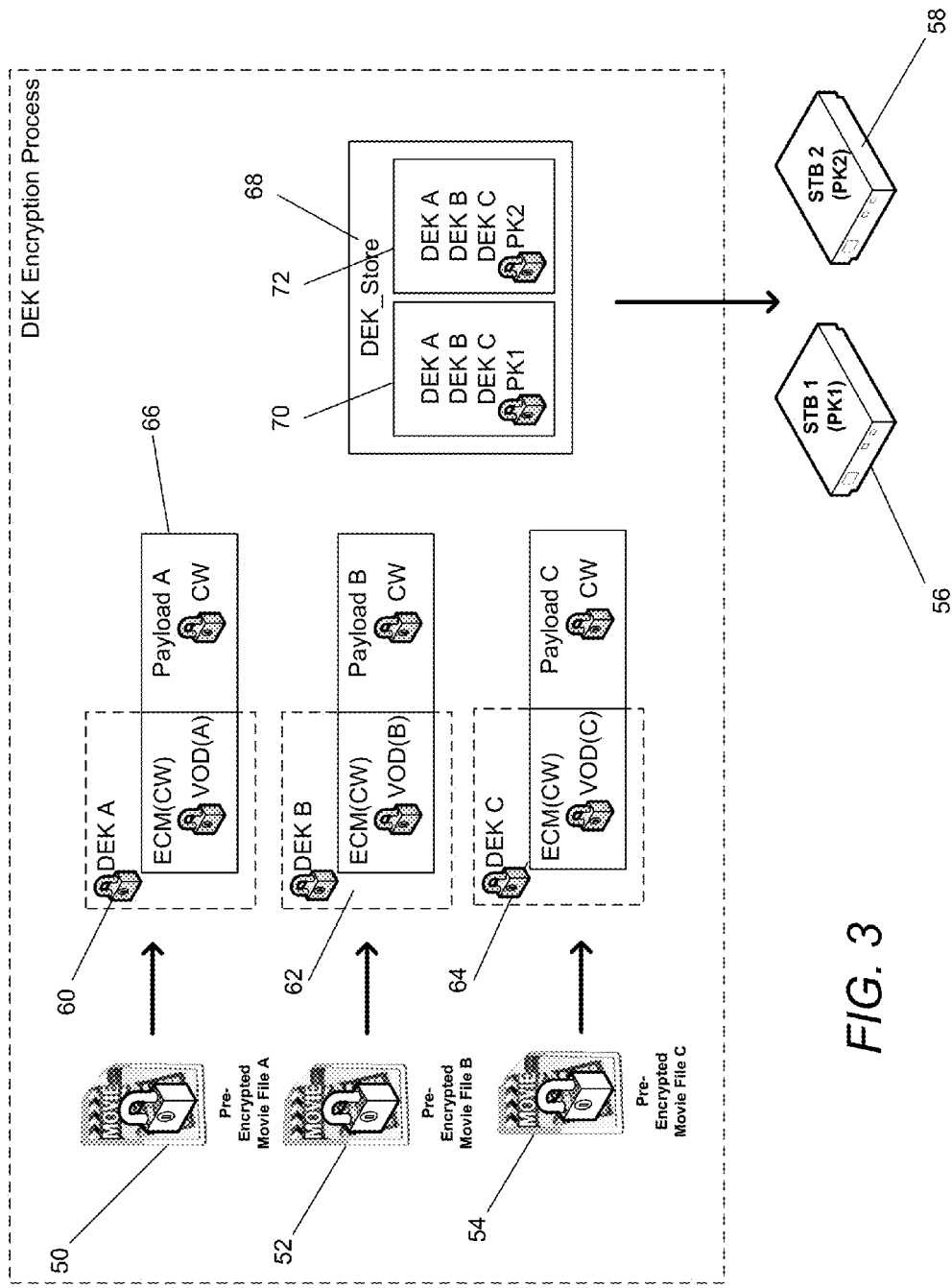
FIG. 3 illustrates the over-encryption of pieces of content for playback on a pair of playback devices in accordance with an embodiment of the invention.

An encryption process utilized in the issuance of protected content in accordance with an embodiment of the invention is illustrated in FIG. 3. In the illustrated embodiment, three pieces of content 50, 52, and 54 are issued for playback on two playback devices 56, and 58. Each piece of content is pre-encrypted by a CA system and includes an associated ECM. A separate content key is generated for each piece of content. In the illustrated embodiment, the content keys are identified as DEK A, DEK B, and DEK C respectively. The content keys are then used to over-encrypt a portion of the ECM 60, 62, and 64 associated with each piece of content. A copy of each content key is then encrypted using the public key for each playback device (in the illustrated embodiment shown as PK1 and PK2). The encrypted copies of the content keys 70, and 72 associated with each playback device are then used to create a store file along with the playback device IDs or other information such as certificate IDs used by the CA system to uniquely identify the playback devices associated with the public keys. The store file can optionally contain other metadata such as a movie ID, movie key ID, content key ID, kiosk ID, headend ID, operator ID, CA server location (URL), transaction ID, date and time of purchase, user account, and/or any other data appropriate to a specific application. In addition, store files utilized in many embodiments of the invention specify the encrypting options that were utilized in the over-encryption. For example, the encryption process is specified where multiple processes are supported and the portions encrypted can be identified (e.g. the number of bytes within each TS packet that are over-encrypted and/or the portions of ECM packets that are encrypted). When the store file and the over-encrypted content are provided to either of the two playback devices 56, 58, the playback devices can use their private keys to access the content keys, the content keys to access the ECM, and the ECM to obtain the necessary keys from the CA system to enable playback of the content.

Although a specific process is illustrated in FIG. 3, any of a variety of encryption processes can be utilized to over-encrypt different portions of the symmetrically pre-encrypted content and to secure the content keys for distribution to playback devices in accordance with embodiments of the invention. Processes for over-encrypting specific portions of an ECM are discussed further below.

Over-encryption of an ECM

Figure 4:
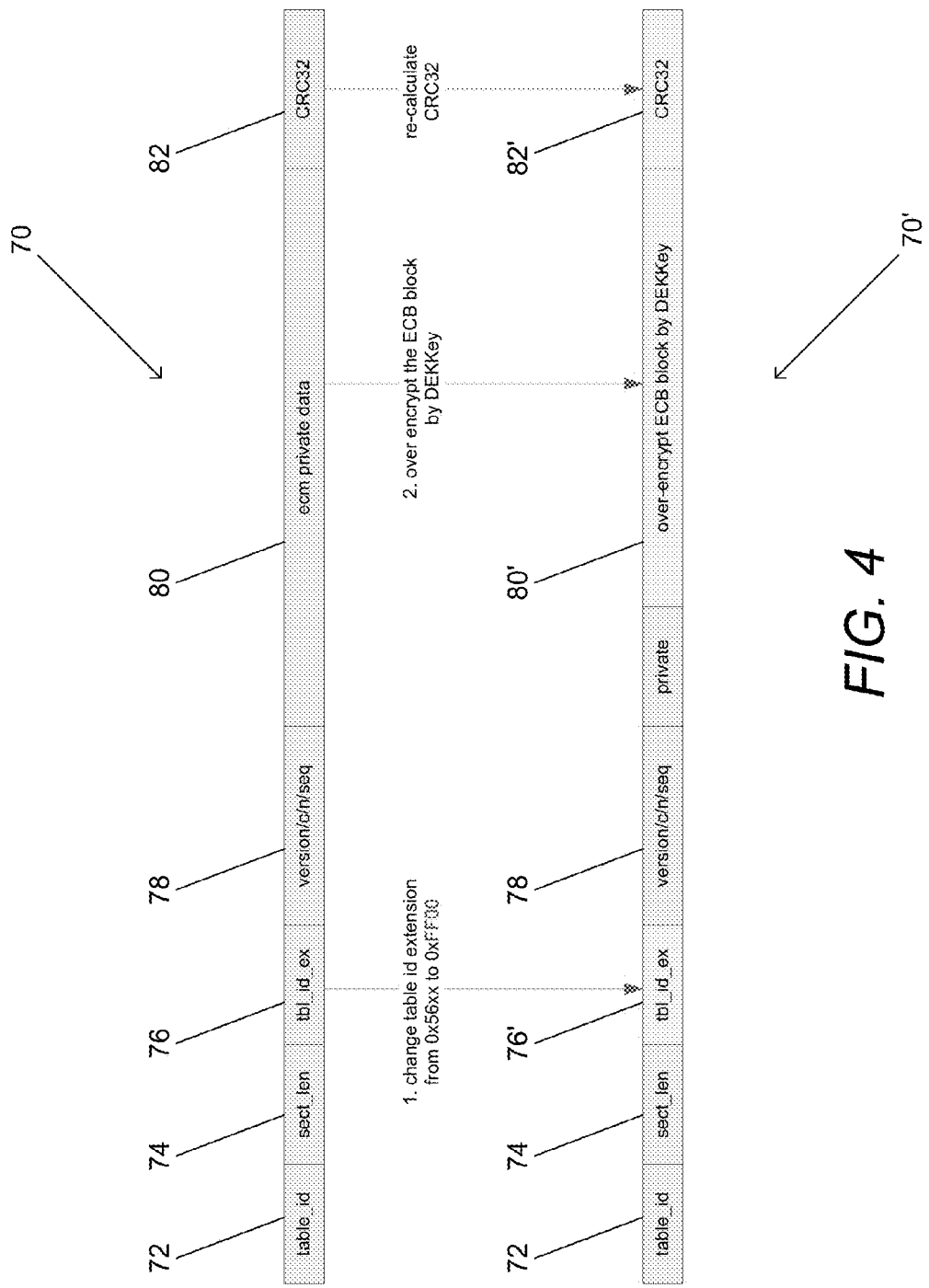
FIG. 4 illustrates a process for over-encrypting an Entitlement Control.

The over-encryption of a portion of an ECM in accordance with an embodiment of the invention is illustrated in FIG. 4. In the illustrated embodiment, the ECM 70 includes a Table ID (table_id) 72, a Section Length (sec_len) 74, a Table ID Extension (tbl_id_ex) 76, fields (version/c/n/seq) 78, ECM private data 80, and a 32 bit cyclic redundancy check. The process involves changing the Table Id Extension 76 of the ECM from 0x56xx to 0xFF00 to indicate that the ECM has been modified, and over-encrypting at least a sufficient portion of the ECM private data 80 with a content key to prevent a playback device from obtaining the information necessary to playback the content from the CA system. In several embodiments, the modification of the Table Id Extension 76 is unnecessary as information concerning the packets that are over-encrypted are provided within a store file. The process completes by recalculating the 32 bit cyclic redundancy check and replacing the CRC32 in the ECM so that it will pass CRC tests. As can be readily appreciated, the process illustrated in FIG. 4 is specific to processes involving the over-encryption of private data within an ECM. As noted above, other portions of a symmetrically pre-encrypted content file can be over-encrypted using a content key as is appropriate to a specific CA system and application in accordance with embodiments of the invention.

Connected and Disconnected Issuance of Content

Much of the above discussion assumes a network connection between the kiosk and the headend. Off-line content delivery systems in accordance with embodiments of the invention are also capable of issuing content in circumstances where a network connection between the kiosk and the headend. In many embodiments, the kiosk is capable of operating in three modes depending upon whether the kiosk can establish a network connection with the CA system, and whether the kiosk can obtain device certificates from the user's portable media drive. The three modes are illustrated in FIGS. 5a-5c.

The operation of a kiosk when issuing content when a network connection is available in accordance with an embodiment of the invention is illustrated in FIG. 5a. In the illustrated embodiment, the kiosk 12 locally stores three pieces of symmetrically pre-encrypted content 90, 92, and 94. When a portable media drive 14 is presented to the kiosk, the kiosk performs a process 100 in order to issue content to the portable media drive. The process 100 includes determining (102) whether the user has a user account and detecting (104) whether the portable media drive has been presented to the off-line content delivery system. The kiosk looks up the user's ID and associated Unique IDs for the user's playback devices on a subscriber management system at the headend (106). The portable media drive 14 is then checked (108) to determine whether it has previously been presented to the off-line content delivery system and, therefore, device certificates for the playback devices associated with the user are present on the portable media drive. In the illustrated embodiment, a new portable media drive is presented to the kiosk and so the device certificates for the playback devices associated with the user are fetched (110) from the CA system at the headend 96. In several embodiments, the fetched device certificates are compared (112) to a locally stored certificate revocation list. Although in many embodiments, only valid device certificates can be obtained from the CA system and the comparison step is unnecessary. Unique content keys (DEKs) are then randomly generated (114). In the illustrated embodiment, the random keys are generated using the public keys of the device certificates. The content keys are then used to over-encrypt (116) at least a portion of each symmetrically pre-encrypted piece of content. A copy of each content key is then encrypted (118) using the public key associated with each playback device. During the process, the over-encrypted pieces of content 130, and 132, a store file containing the public key encrypted content keys, and the device certificates are written (120) to the portable media drive 14. In many embodiments, the store file is not separate from the over-encrypted pieces of content. The public key encrypted content keys can for example be appended to the over-encrypted pieces of content as metadata. The process completes (122) by closing the session with the portable media drive. Optionally, the kiosk may sign the store file such that a playback device can verify that the content and the keys come from a valid kiosk (e.g. to prevent the use of unauthorized kiosks) and to check the integrity of the key file. In this case, the kiosk stores its own certificate on the media drive as well, and the playback device possesses the root CA certificate in order to verify the kiosk certificate (and the corresponding certificate chain).

The process illustrated in FIG. 5A involves obtaining device certificates from the CA server. In the event that the kiosk is temporarily unable to connect to the CA server, the kiosk can continue to enable users to download movies by defaulting to a secret shared key used to seed the content key generation and to encrypt the content keys for delivery to playback devices. The shared secret key is securely stored in the playback device to use in the decryption of content keys that are symmetrically encrypted by the kiosk instead of encrypted using the playback device's public key. A process utilized by the kiosk to issue protected content, when it is unable to contact the headend, is shown in FIG. 5B. The process 100' is similar to the process 100 shown in FIG. 5a with the exception that when the process is unable to fetch the device certificates from the CA system, the decision (110) is made to use the secret shared key to generate (126) the content keys. The content keys are used to over-encrypt at least a portion of the symmetrically pre-encrypted content and the secret key is also used to encrypt the content keys for delivery to playback devices. Due to the fact that the device certificates are unavailable to the kiosk, the device certificates cannot be written to the portable media drive with the over-encrypted content and the encrypted content keys. The kiosk does, however, provide information to indicate to the playback device that the content keys are symmetrically encrypted using the secret shared key. The kiosk can record the user's ID when the user logs in and the date/time of the transaction, which can be reported back to the subscriber management system at the headend when the kiosk is back online. The content can be issued in this way, because the final transaction typically does not occur until an attempt is made to playback the content using the CA system on the playback device. The secret keys provide additional security, however, the off-line content delivery system relies upon the CA system to prevent content playback on playback devices that are not associated with a user in this mode.

Both of the processes illustrated in FIGS. 5a and 5b assume that the portable media drive presented to the kiosk is new (i.e. does not contain device certificates written to the portable media drive by a kiosk). A process for issuing content to a portable media drive that includes device certificates for the playback devices associated with a user in accordance with an embodiment of the invention is illustrated in FIG. 5c. The process 100" is similar to the process 100 shown in FIG. 5a with the exception that device certificates are present on the portable media drive, therefore, the process reads (128) the device certificates from the portable media drive and verifies (112) them against a locally stored certificate revocation list. Assuming the certificates are not on the revocation list, the process proceeds using the device certificates obtained from the portable media drive instead of device certificates obtained from the CA system. In the illustrated embodiment, the device certificates are shown as being written (122) back to the portable media drive.

Although specific processes are illustrated in FIGS. 5a-5c for issuing protected content to a portable media drive in different circumstances, any of a variety of processes can be utilized to accommodate the temporary unavailability of the CA system in accordance with embodiments of the invention including but not limited to processes where device certificates are stored locally at the kiosk. In addition, systems in accordance with embodiments of the invention can involve the initial registration of a portable media drive so that the drive is always used to provide the device certificates to the kiosk. In such systems, user authentication can occur at the kiosk and/or at the playback device.

Playback of Issued Content

Playback devices in accordance with embodiments of the invention use their private keys to obtain content keys in the clear and remove the over-encryption of the protected content. At which point, the playback device can use information within the content file to request the ability to playback the content from the CA system. As noted above, the CA system typically symmetrically encrypts the content. The cryptographic key used to encrypt the content is often referred to as the movie key. Therefore, the CA system can respond to a request from the playback device by transmitting the movie key or information that enables the playback device to access the movie key. The specific mechanism used to obtain access to the symmetrically encrypted content after the over encryption has been removed depends upon the specific CA system or DRM framework utilized in the off-line content delivery system.

A process for playing back content issued by an off-line content delivery system in accordance with an embodiment of the invention is illustrated in FIG. 6. A portable media drive 14 is presented to a playback device 22. As noted above, the portable media drive may also be incorporated within a portable playback device. The portable media drive includes two over-encrypted content files 130, and 132, a store file 134 containing at least one set of content keys encrypted using the public key of the playback device, and device certificates 136. The playback device 22 utilizes a (preferably secure) CPU 138 as part of a process 150 for accessing and playing back the over encrypted content.

The process 150 optionally includes detecting (152) that a media drive is connected to the playback device. The private key associated with the device's certificate is extracted (154) from the secure CPU and used to decrypt (156) at least the content key associated with the particular piece of content that the playback device is attempting to access. The content key is then used to decrypt (158) the over-encrypted portions of the piece of content that the playback device is attempting to access. Once the over-encryption is removed, the content file is still encrypted (i.e. the symmetrical pre-encryption performed prior to the over-encryption). Therefore, the symmetrically encrypted file is passed (160) to the playback device. At this point, the playback device can treat the file in a similar way in which online on-demand content is treated in a conventional. CA system. In embodiments where the ECM is over-encrypted, for example, the playback device obtains the ECM in the clear and searches its encrypted memory for an existing matching movie key, and if it cannot find one, will make a connection to the CA system at the headend and perform a standard movie key request over a secure IP connection. In the illustrated embodiment, the playback device fetches (162) the movie key from the CA system and uses the movie key to decrypt (164) the content for playback on a display 140. In many embodiments, a session-based watermark may also be applied to the video content after decoding has occurred using information including but not limited to the playback device's ID, the VOD purchase transaction ID, and/or the kiosk transaction ID. Typically, the movie key is flushed from the memory of the playback device after certain business rule logic requirements have been met. In this way, the off-line content delivery system can issue content to both rent and own.

Although a specific process is illustrated in FIG. 6, as is noted above any of a variety of processes can be utilized to access content issued by an off-line content delivery system in accordance with embodiments of the invention including but not limited to processes that accommodate any of a variety of CA or DRM systems.

While the above description contains many specific embodiments of the invention, these should not be construed as limitations on the scope of the invention, but rather as an example of one embodiment thereof. For example, much of the above discussion is in the context of off-line content delivery. However, systems and processes in accordance with embodiments of the invention can also be utilized in the online delivery of content where appropriate. Accordingly, the scope of the invention should be determined not by the embodiments illustrated, but by the appended claims and their equivalents.

What is claimed is:

1. A method of issuing protected content, comprising:
symmetrically pre-encrypting the content;
receiving a request to issue content for playback on at least one playback device associated with a user account, where each playback device includes a processor containing a private key assigned to the playback device by a conditional access system and where the conditional access system issues device certificates including a public key for each playback device;
generating a content key and over-encrypting at least a portion of the symmetrically pre-encrypted content using the content key in response to the request;
obtaining a public key for each playback device;
encrypting at least one copy of the content key using the public key of each playback device associated with the user account;
delivering the over-encrypted content and the at least one encrypted copy of the content key to a playback device associated with the user account; and
writing the device certificate of each playback device associated with the user account to a portable media drive;
wherein obtaining a public key for each playback device further comprises obtaining a public key for each playback device from the portable media drive; and
wherein delivering the over-encrypted content and the at least one encrypted copy of the content key to a playback device associated with the user account comprises writing the over-encrypted content and the at least one encrypted copy of the content key to the portable media drive.

2. The method of claim 1, wherein the symmetrically pre-encrypted content includes an entitlement control message and over-encrypting at least a portion of the symmetrically pre-encrypted content using the content key in response to the request comprises over-encrypting at least a portion of the entitlement control message using the content key.

3. The method of claim 1, wherein the conditional access system issues device certificates including a public key for each device and further comprising delivering the device certificate of each playback device associated with the user account to the playback device with the over-encrypted content and the at least one encrypted copy of the content key.

4. The method of claim 1, wherein the symmetrically pre-encrypted content includes an entitlement control message and over-encrypting at least a portion of the symmetrically pre-encrypted content in response to the request comprises over-encrypting at least a portion of the entitlement control message.

5. The method of claim 1, wherein obtaining a public key for each playback device further comprises obtaining a public key for each playback device from the conditional access system.

6. An off-line content delivery system, comprising:
a kiosk configured to receive a portable media drive and to communicate with a headend including a conditional access system via a network and a storage device containing symmetrically pre-encrypted content; and
a playback device configured to communicate with a portable media drive and to communicate with the headend via a network, where the playback device includes a processor containing a private key issued to the playback device by the conditional access system;
wherein the kiosk is configured to issue protected content to the portable media drive by retrieving symmetrically pre-encrypted content corresponding to user selections from the storage device, and to over-encrypt at least a portion of the retrieved symmetrically pre-encrypted content using at least one content key generated by the kiosk;
wherein the conditional access system assigns a unique public key to each playback device;
wherein the kiosk is configured to encrypt a copy of each content key using the public key of at least one playback device associated with a user account;
wherein the kiosk is configured to write the encrypted copy of each content key to the portable media drive;
wherein the playback device is configured to obtain each content key in the clear using its private key and to remove the over-encryption from the protected content using the content key; and
wherein the playback device is configured to inspect the symmetrically encrypted content and obtain information from the conditional access system enabling playback of the symmetrically encrypted content.

7. The system of claim 6, wherein the storage device is local to the kiosk.

8. The system of claim 6, wherein the storage device is located at the headend.

9. The system of claim 6, wherein the symmetrically pre-encrypted content includes an entitlement control message and the kiosk is configured to over-encrypt at least a portion of the entitlement control message using the content key.

10. The system of claim 6, wherein the content key is randomly generated by the kiosk.

11. The system of claim 9, wherein the process used to randomly generate the content key is seeded by the public key of at least one of the playback devices associated with the user.

12. The system of claim 6, wherein the user account is maintained on a subscriber management system at the headend.

13. The system of claim 6, wherein the kiosk is configured to obtain the public key for each playback device associated with the user account from the conditional access system.

14. The system of claim 6, wherein the kiosk is configured to obtain the public key for each playback device associated with the user account from the portable media drive.

15. The system of claim 6, wherein the conditional access system issues device certificates including a public key for each device.

16. The system of claim 15, wherein the kiosk is configured to write the device certificates for each playback device associated with the user account to the portable media drive.

17. The system of claim 6, wherein the playback device is a portable playback device incorporating a portable media drive.

18. A kiosk for issuing protected content, comprising:
a processing system configured to communicate with a portable media drives via a communication port;
wherein the processing system comprises a processor configured by software to:
retrieve symmetrically pre-encrypted content stored on a storage device in response to a user request received via a user interface;
over-encrypt at least a portion of each piece of retrieved content using a content key;
obtain a public key assigned to at least one playback device associated with a user account from a portable media drive via the communication port, where the portable media drive contains a device certificate including a public key issued to the playback device by a conditional access system;
encrypt a copy of each content key using the public key assigned to each playback device associated with the user account; and
write the over-encrypted content and the encrypted copies of each content key to a portable media drive via the communication port.

19. The kiosk of claim 18, wherein the storage device containing the symmetrically pre-encrypted content is a local storage device.

20. The kiosk of claim 18, wherein the kiosk processor is configured by software to communicate with the storage device containing the symmetrically pre-encrypted content via a network connection.

21. The kiosk of claim 18, wherein the symmetrically pre-encrypted content includes an entitlement control message and the processor is configured by software to over-encrypt at least a portion of the entitlement control message using the content key.

22. The kiosk of claim 18, wherein each content key is randomly generated by the kiosk.

23. The system of claim 18, wherein the processor is configured by software to obtain the public key for each playback device associated with the user account from a conditional access system via a network connection.

24. The system of claim 18, wherein the processor is configured by software to obtain the public key for each playback device associated with the user account from a portable media drive via the communication port.

25. The system of claim 18, wherein device certificates contain the public keys for each playback device.

26. The system of claim 18, wherein the processor is configured by software to write the device certificates for each playback device associated with the user account to a portable media drive via the communication port.

27. A playback device, comprising:
a playback client system including a private key, where the playback client system comprises a processor configured by software to:
communicate with a conditional access system via a network connection;
communicate with a portable media drive, where the portable media drive contains a device certificate including a public key issued to the playback device by the conditional access system;

receive over-encrypted content and an encrypted content key from a portable media drive;

obtain the content key in the clear using the private key;

remove the over-encryption from the content using the content key; and use information from the content to obtain information enabling playback of the content from the conditional access system via the network connection.

28. The playback device of claim 27, wherein the portable media drive is an integrated part of the playback device.

29. The playback device of claim 27, wherein the processor is configured by software to communicate with the portable media drive via a communication port.

* * * * *